United States Patent [19]

Antoniello

[11] Patent Number: 4,815,703
[45] Date of Patent: Mar. 28, 1989

[54] SINK HANDLE VALVE

[75] Inventor: Frank Antoniello, Commack, N.Y.

[73] Assignee: I.W. Industries, Inc., Melville, N.Y.

[21] Appl. No.: 68,900

[22] Filed: Jun. 30, 1987

[51] Int. Cl.$^4$ .................. F16K 31/528; F16K 25/00
[52] U.S. Cl. ........................... 251/251; 251/174;
251/176; 251/263; 137/625.41; 137/606;
137/801
[58] Field of Search ............. 137/454.5, 625.4, 625.41,
137/625.46, 597, 637, 637.1, 606, 604, 801;
251/251, 263, 174, 176

[56] References Cited

U.S. PATENT DOCUMENTS

| | | | |
|---|---|---|---|
| 2,912,217 | 11/1959 | Freeman | 251/214 |
| 3,084,902 | 4/1963 | Hare | 251/88 |
| 3,286,720 | 11/1966 | Mongerson | 137/119 |
| 3,423,067 | 1/1969 | Foster | 251/309 |
| 3,647,179 | 3/1972 | Scaramucci | 251/172 |
| 3,807,455 | 4/1974 | Farrell | 137/625.31 |
| 4,005,728 | 2/1977 | Thorp | 137/270 |
| 4,058,289 | 11/1977 | Hicks | 137/606 |
| 4,064,900 | 12/1977 | Schmitt | 137/606 |
| 4,111,392 | 9/1978 | Edelman | 251/214 |
| 4,319,735 | 3/1982 | Moen | 251/175 |
| 4,397,330 | 8/1983 | Hayman | 137/625.41 |
| 4,580,600 | 4/1986 | Mazzei et al. | 137/625.46 |
| 4,602,762 | 7/1986 | Koch | 251/174 |
| 4,681,140 | 7/1987 | Hayman | 137/625.4 |

Primary Examiner—George L. Walton
Attorney, Agent, or Firm—Alfred M. Walker

[57] ABSTRACT

A sink handle for use in a water faucet, which may be operated at a minimum use of manual force is disclosed. The sink handle generally includes a valve spindle contained within a body, with the spindle being rotatable by a fluid flow. The sink handle also includes a seat bearing adjacent to said valve spindle and a cushion upon which said spindle is rotatable. A bonnet, which may be opened and closed, permits a flow of a fluid therethrough by opening a movable closure element. The bonnet is rotatable as a result of the rotation of the valve spindle. In preferred embodiments of the invention, O-rings function as the cushion. Additionally, a seat bearing may be impregnated in polytetraflouroethylene.

6 Claims, 3 Drawing Sheets

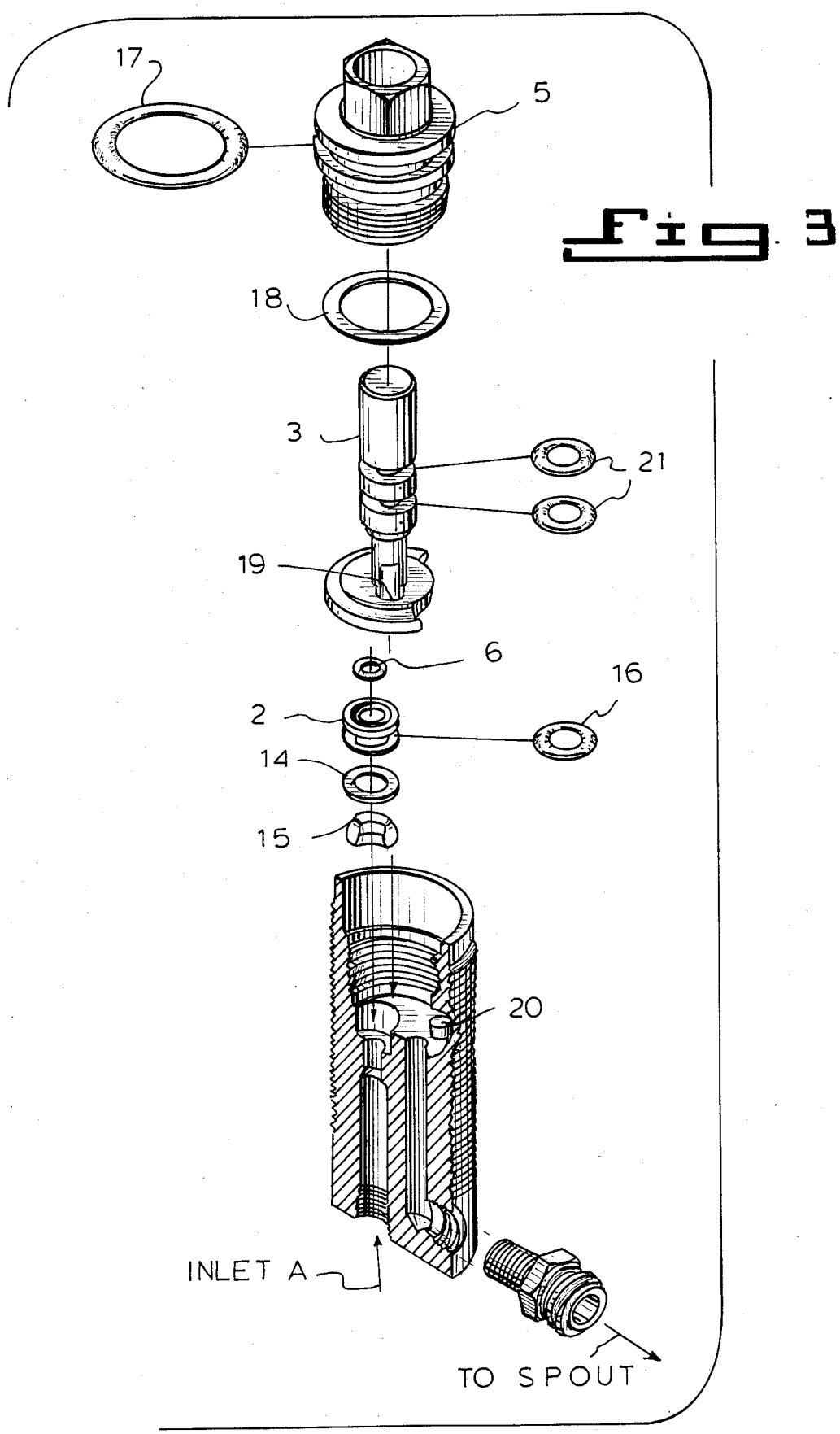

SINK HANDLE VALVE

BACKGROUND OF THE INVENTION

1. Field of the Invention

The present invention relates to a sink handle valve for use in a water faucet and is particularly usable with a minimum of manual force required to open and close the valve. The spindle operative to the faucet device is supported by a polytetraflouroethylene ring disposed upon a seat bearing. In one embodiment a spindle is rotated without the application of direct force upon the spindle, which floats, while positioning the flow of water, between an assemblage of ball bearings on the top and the friction reducing seat bearing on the bottom. Furthermore, in the preferred embodiment the valve opens by a slide handle which actuates the spindle by use of a cam and pin structure.

2. Description of the Prior Art

Various sink faucet handle valves are discussed below.

A valve is disclosed in Freeman, U.S. Pat. No. 2,912,217 wherein a stem is inserted into a seat bed. Freeman does not provide a friction reducing means for repeated movements of the stem nor the capability to position the stem without the application of direct pressure.

A faucet valve is taught in Hare, U.S. Pat. No. 3,084,902. Hare discloses a valve wherein an O-ring is used to improve the sealing of the valve. The Hare invention provides a valve member rotatable within a sleeve.

Mongerson, in U.S. Pat. No. 3,286,720 discloses a mixing faucet. In the Mongerson device, two input supplies mix two sources of fluids, while a valve is sealed by use of an O-ring. Mongerson discloses no means to rotate the valve without application of direct pressure.

Foster, in U.S. Pat. No. 3,423,067, discloses a faucet valve using O-rings as seals, as well as the use of resilient strip-like means to maintain seals upon the walls of the valve. Foster does not disclose the indirect application of force upon a member, nor does it disclose the floating effect of a spindle between bearings and a friction reducing seat.

Farrell, in U.S. Pat. No. 3,807,455 discloses a valve structure which equalizes input fluid pressures by use of a conical spring.

A valve assembly is taught by Scaramucci in U.S. Pat. No. 3,647,179. The Scaramucci valve has a positioning means having a seat for a seal.

Thorp, in U.S. Pat. No. 4,005,728, disclosed a faucet valve, having O-rings as seals.

A faucet valve and dispenser as taught by Hicks is disclosed in U.S. Pat. No. 4,058,289. Hicks teaches a valve assembly having a rotable stem and seals disposed upon the sides of the stem, encircling the stem.

Edelman, in U.S. Pat. No. 4,111,392, disclosed a valve wherein the stem is positioned upon a spring.

Moen, in U.S. Pat. No. 4,319,735, disclosed another valve structure in which the seal is isolated from the path of the flow to prevent excessive fluid flow pressures upon the seal. In this invention, the seal encircles the circular valve stem member.

Finally, in U.S. Pat. No. 4,602,762 by Koch, another valve is disclosed. In the Koch patent, the stem is encircled by sealing rings. A seat ring is provided in combination with a spring to insure sealing. A ball is also provided within the valve to engage the seat valve.

There are in the prior art various valves in which O-rings are provided to encircle stem members for sealing purposes. However, none of the prior art devices fulfills a long felt need for a spindle member to rotate upon the surface of an 0-ring, as opposed to being positioned between the inner surfaces of the 0-ring. Furthermore, none of the prior art devices disclose a cam and pin structure to cause the spindle to rotate without the direct application of force upon the spindle.

This long felt need is derived from the fact that faucet valves require constant rotation to allow the flow and restriction of flow of fluids. Consequently, the fluid pressure charges cause undue force upon the stem members each time the valve is actuated. Also, the direct application of force tends to increase the chances of breakage of the stem members and other moving parts.

Often the application of circular, enclosing seals about a stem increases tension upon the stem. A need is present to provide a valve with seals which will minimize the horizontal, inward pressure of seals upon a stem member. The ability to rotate a stem spindle during the operation of a valve with the minimum of direct force and with the minimum of friction upon the moving parts of the spindle provides a significant operational benefit.

The ability to rotate a spindle with the minimum of friction and the minimum of force allows a valve to operate under constant changing fluid pressure condition, with the maximum efficiency.

SUMMARY OF THE INVENTION

The device, according to the present invention, permits the rotating of the valve spindle in a smooth operation. It provides a flexible seat bearing biased to the spindle, said bearing acting as a cushion upon which the spindle rotates for the opening and closing of a bonnet, which turns to permit the flow of fluids therethrough by opening and closing a movable valve closure element.

In one embodiment of the device, fluids such as water enter an inlet through a port and then through a hole in a seat bearing, where the valve is in the open position. Water reverses direction and passes through a port hole around the spindle. The water goes through an outlet and into the spout for consumption and use. To seal the water flow, the spindle is rotated 90° to a position, where flow is interrupted. The spindle is rotated upon a seat bearing impregnated with polytetraflouroethylene and an O-ring, which function as a cushion upon which the spindle rotates.

In another embodiment, the rotating of the spindle is accomplished by a sliding valve design. Water enters an inlet through a port hole and then through a hole in a seat bearing. When the valve is in the open position water passes through another port, bypassing the spindle to an outlet port hole and then to the exit spout. To reach the closed position, an urging means causes the spindle to rotate 90° such that the flow of water is shut off. The spindle is rotated by a cam and pin structure. The application of force upon a horizontally sliding handle causes the cam to rotate, thus rotating the spindle attached to the cam. As such, force is not applied directly to the spindle, thus minimizing friction upon the spindle.

In this preferred sliding handle embodiment, the spindle is positioned below a resilient means biasing the spindle downward toward the seat, said means comprising a ring of ball bearings. The spindle floats between the ring of ball bearings and a seat bearing, thus insuring a minimum of friction. Polytetraflouroetheylene is used because its coefficient of friction is lower than any other friction reducing material. This reduces the need for lubricants within the rotating spindle structure.

A feature provided by the instant invention is that it is easy to repair by virtue of its simplicity in design.

BRIEF DESCRIPTION OF THE DRAWINGS

The invention will be better understood with the aid of the drawings, in which: FIG. 3 is an exploded perspective view of another embodiment of the device.

DESCRIPTION OF THE PREFERRED EMBODIMENT

Figure 1:
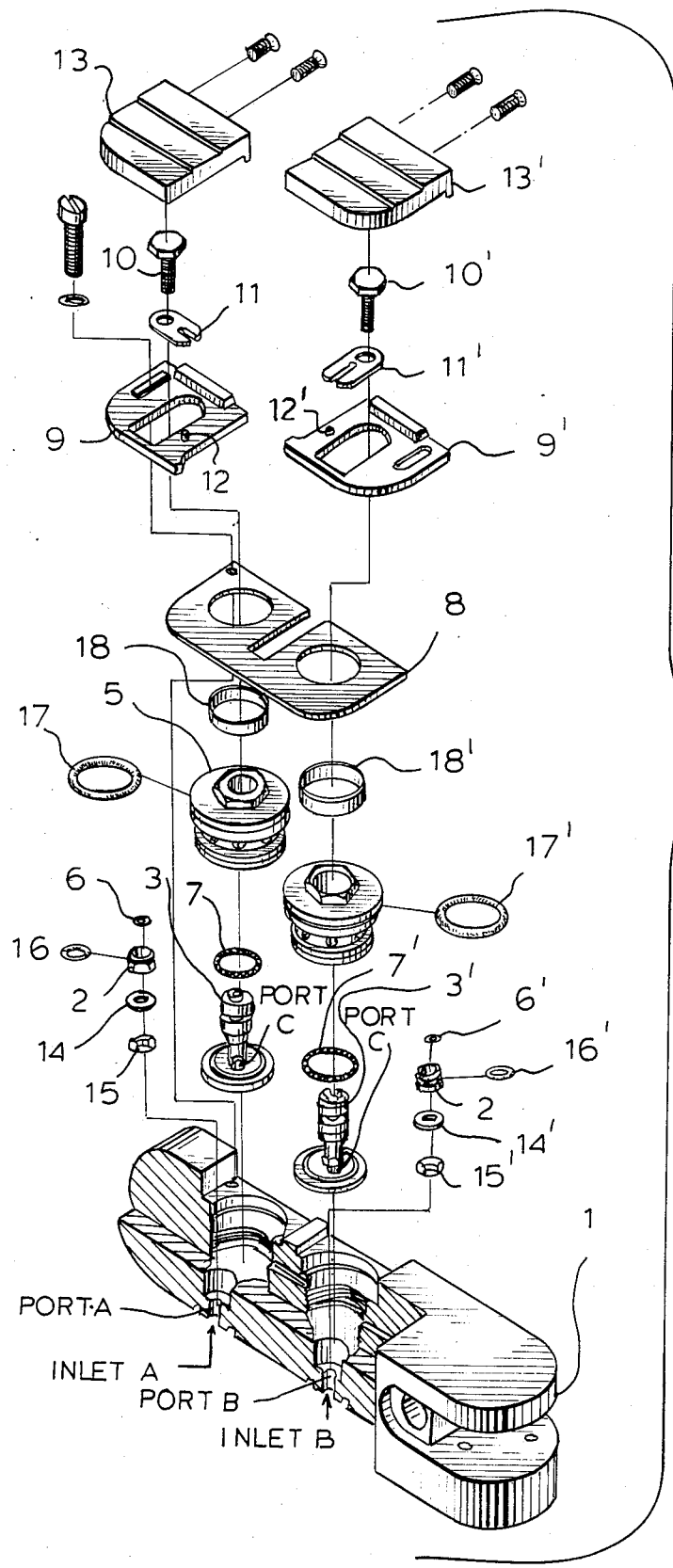
FIG. 1 is an exploded perspective view of one embodiment of the valve device showing the cam operational spindle and floating spindle.

As shown in FIG. 1, a base 1 is provided having Ports A and B for hot and cold water flows. Water enters into Ports A and B and then through a hole in seat bearing 2 and $2^1$. When the valve is in an open position water passes through Port C around spindle 3 or $3^1$ and through holes 4 and $4^1$ of cylindrical bonnet tubes 5 and $5^1$, said holes 4 and $4^1$ disposed horizontally through the vertical surface of bonnet tubes 5 and $5^1$. Water then exits through a spout (not shown).

When the spindle 3 or $3^1$ is rotated, an 0-ring seal 6 and $6^1$ disposed to seat bearings 2 and $2^1$ are positioned 90° from Port C, thus sealing off the water flow spindle 3 and $3^1$ floats between a resilient means 7 and $7^1$ biasing the spindle 3 and $3^1$ to seat bearings 2 and $2^1$. Said seat bearings 2 and $2^1$ are impregnated with polytetraflouroethylene, thus insuring a minimum of friction. Said resilient means 7 and $7^1$ comprises circular rings of ball bearings. The spindles 3 and $3^1$ are positioned between a hole in bonnets 4 and $4^1$ which are biased toward cam assembly means comprising a slide washer 8 disposed to bottom caps 9 and $9^1$ having holes through which the spindles 3 and $3^1$ are attached to movable cam bolts 10 and $10^1$. Cams 11 and $11^1$ rotate upon pins 12 and $12^1$ disposed vertically from the upper horizontal surface of bottom caps 9 and $9^1$. Rotation of cams 11 and $11^1$ is activated by the application of horizontal force upon slide handles 13 and $13^1$, which movement urges bottom caps 9 and $9^1$ horizontally, thus engaging cams 11 and $11^1$ with pins 12 and $12^1$. The cam structure reduces the application of direct force upon spindles 3 and $3^1$, thus ensuring less breakage of spindles 3 and $3^1$.

Seat bearings 2 and $2^1$, upon which rest O-rings 6 and $6^1$, are biased above spring spacers 14 and $14^1$. The resilience of the spindle is further enhanced by the cushioning effect of wave springs 15 and $15^1$ disposed between spring spacer 14 or $14^1$, and base 1. Seat bearings 2 and $2^1$ may also have additional O-rings 16 and $16^1$. To enhance sealing of bonnets 4 and $4^1$, O-rings 17 and $17^1$ are disposed horizontally with said bonnets 4 and $4^1$.

Slide washer 8, upon which bottom caps 9 and $9^1$ rest, is biased toward bonnets 5 and $5^1$ by a means of bonnet sleeves 18 and $18^1$, through which cam bolts 10 and $10^1$ rotate, after being rotated by means of cams 11 and $11^1$, which cams 11 and $11^1$ rotate about pins 12 and $12^1$.

Figure 2:
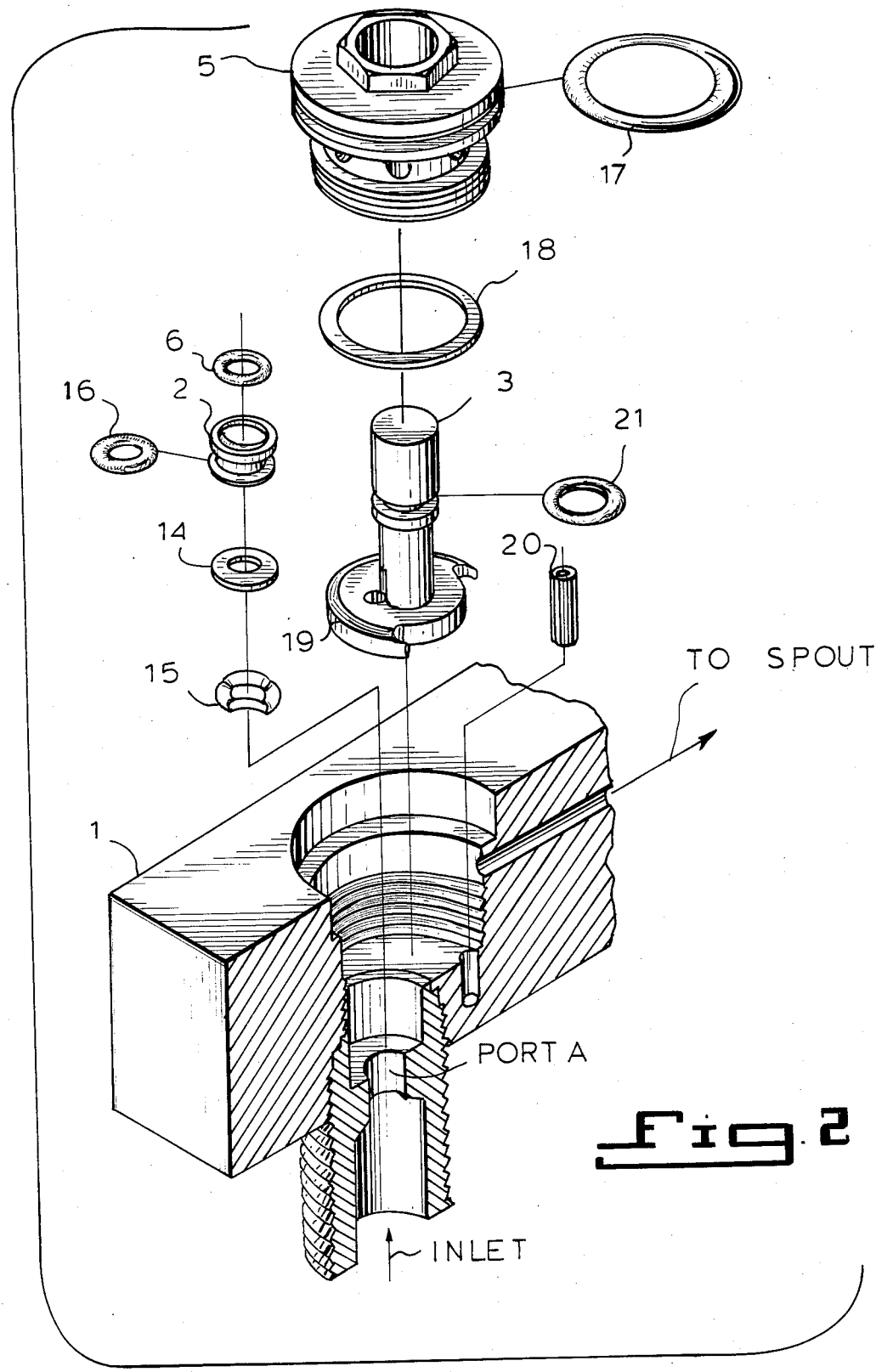
FIG. 2 is an exploded perspective view of another embodiment of the device.

As shown in FIGS. 2 and 3, spindles 3 and $3^1$ do not have the cam structure and resilient means 7 and $7^1$. The spindles 3 and $3^1$ rotate upon seat bearings 2 and $2^1$ and force is applied directly to bonnet tubes 5 and $5^{11}$ in which spindles 3 and $3^1$ are positioned. In FIGS. 2 and 3, spindle 3 rotates 90° within spindle washer 18 by means of slotted disc shaped flange 19 encircling the spindle 3, said phlange 19 being slotted so that ¼ of its exterior circumference alternately rotates 90° about vertically extending roll pin 20. Spindle 3 is also encircled by O-ring 21.

It is understood that although a preferred embodiment has been shown, various modifications may be made without departing from the spirit of the invention, as defined by the following claims.

I claim:

1. A sink handle, comprising:
a body having an inlet port and an outlet port for a fluid to pass through, with the fluid entering said body through the inlet port;
a seat bearing being contained by said body, said seat bearing having a hole for accepting the fluid entering said body through the inlet port of said body;
a valve spindle being contained by said body and being biased to said seat bearing is cushioned by said seat bearing upon which it is capable of being rotated;
a movable closure element having a slotted, disc-shaped flange encircling said valve spindle, said flange being slotted to that approximately ¼ of its exterior circumference alternatively rotates 90° about a vertically extending roll pin, said movable closure element further including a cam assembly having a slide washer that is attached to a bottom cap said slide washer and said cap having openings therein for receiving said valve spindle therethrough for enabling the rotation of said valve spindle, said valve spindle receiving cam bolt attached thereto that receives a cam member which is rotatable upon a pin disposed vertically from the upper horizontal surface of the bottom cap, said cam member being activated by the application of a horizontal force upon a slide handle biased to said cam bolt during relative linear movement of said cap and said washer through a slot means upon a surface of said cap for rotation of said valve; and
a bonnet tube, having a substantially cylindrical shape with a hole disposed horizontally through a vertical surface of said bonnet tube said bonnet being capable of alternatively being in an open and a closed position to permit the flow of the fluid therethrough by opening said adjacent movable closure element, said bonnet being rotatable by means of rotation of said valve spindle.

2. The sink handle according to claim 1, wherein O-rings function as a cushion upon which said valve spindle is rotatable.

3. The sink handle according to claim 1, wherein said seat bearing is impregnated with polytetraflouroethylene.

4. The sink handle according to claim 1, further comprising resilient means for biasing said valve spindle toward said seat bearing.

5. The sink handle according to claim 4, wherein said resilient means includes a circular ring of ball bearings positioned above said seat bearing.

6. The sing handle according to claim 4, wherein said resilient means includes a ring of adjacent ball bearings positioned above said seat bearing, in combination with spring spacers biased below said seat bearing, said spring spacers being movable above a corresponding wave spring, disposed upon said body.

* * * * *